(12) United States Patent
Lee

(10) Patent No.: US 8,548,316 B2
(45) Date of Patent: Oct. 1, 2013

(54) APPARATUS AND METHOD FOR CONTROLLING LIGHT INTENSITY OF CAMERA

(75) Inventor: Choon Bok Lee, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 142 days.

(21) Appl. No.: 13/067,791

(22) Filed: Jun. 27, 2011

(65) Prior Publication Data

US 2011/0317988 A1 Dec. 29, 2011

(30) Foreign Application Priority Data

Jun. 28, 2010 (KR) .......................... 10-2010-0061130

(51) Int. Cl.
*G03B 15/02* (2006.01)
(52) U.S. Cl.
USPC ......................................... 396/108; 396/164
(58) Field of Classification Search
USPC .......................................... 396/61, 108, 164
See application file for complete search history.

(56) References Cited

FOREIGN PATENT DOCUMENTS

| JP | 2008102537 A | * | 5/2008 |
| KR | 10-0189814 | | 1/1999 |
| KR | 10-2006-0129736 | | 12/2006 |
| KR | 10-2010-0018768 | | 2/2010 |

OTHER PUBLICATIONS

Translation of JP Publication No. 2008-102537; Camera Equipped with Focus Detecting Device; Uchiyama, Shigeyuki; Publication Date: May 1, 2008.*
Translation of KR Publication No. 10-2010-0018768; Method and Apparatus for Controlling the Amount of Light Radiated by Camera Flash; Kim, Jeong-Sik; Publication Date: Feb. 18, 2010.*
Korean Notice of Allowance issued Jun. 27, 2011 in corresponding Korean Patent Application No. 10-2010-0061130.

* cited by examiner

*Primary Examiner* — Clayton E LaBalle
*Assistant Examiner* — Fang-Chi Chang

(57) ABSTRACT

Provided is an apparatus and method of controlling light intensity of a camera. The method of controlling light intensity of a camera includes generating a code value for correcting a positional error of the camera to store the positional error in a memory, and then, reflecting the code value for correcting the positional error to generate a code value upon auto-focusing. Next, after measuring a distance to a subject through displacement of a camera lens according to the auto-focusing, light intensity of a flash is adjusted according to the distance to the subject.

5 Claims, 4 Drawing Sheets

Subject

Positional error (Vertical posture)

(Horizontal posture)

Subject

Positional error (Vertical posture)

102

700

APPARATUS AND METHOD FOR CONTROLLING LIGHT INTENSITY OF CAMERA

CROSS-REFERENCE TO RELATED APPLICATIONS

This application claims the benefit of Korean Patent Application No. 10-2010-0061130 filed with the Korea Intellectual Property Office on Jun. 28, 2010, the disclosure of which is incorporated herein by reference.

BACKGROUND OF THE INVENTION

1. Field of the Invention

The present invention relates to a camera, and more particularly, to a technique of controlling light intensity of a camera.

2. Description of the Related Art

In general, an auto-focusing function and a zooming function are installed in a camera mounted in a mobile telecommunication terminal or a digital camera, and a flash is provided to use as an auxiliary light upon low illumination photographing such as indoor photographing or night photographing.

While a conventional flash for a camera mainly uses a Xenon lamp, in recent times, a high intensity light emitting diode (LED) having long lifespan and high brightness is used as a flash for a camera.

In the conventional flash for a camera, light intensity control is performed according to intensity of illumination only, without discrimination of a long or short distance. Accordingly, lack of light intensity occurs at a long distance according to a photographing distance of a subject such that the subject is photographed in dark, and intensity of radiation is saturated at a short distance such that the subject is photographed in white, deteriorating quality of a photographed image.

SUMMARY OF THE INVENTION

The present invention has been invented in order to overcome the above-described problems and it is, therefore, an object of the present invention to provide a method and apparatus for controlling light intensity of a camera that are capable of controlling light intensity according to a distance from a subject.

In accordance with one aspect of the present invention to achieve the object, there is provided a method of controlling light intensity of a camera, which includes: (A) generating a code value for correcting a positional error of the camera to store the code value in a memory; and (B) performing an auto-focusing function through a code value, to which the code value for correcting the positional error is added, to measure a distance to a subject; and (C) adjusting light intensity of a flash according to the distance to the subject.

Step (A) may include (A-1) performing the auto-focusing function in a state in which the camera is in a horizontal posture to measure a current value applied to drive a voice coil actuator (VCA) of the camera; (A-2) performing the auto-focusing function in a state in which the camera is in a vertical posture to measure a current value applied to drive the VCA of the camera; and (A-3) obtaining a current value of the positional error of the camera, and then, converting the current value of the positional error into a code value to store the code value in the memory.

Step (B) may include (B-1) adding the code value for correcting the positional error and generating a code value for the auto-focusing; (B-2) generating a current corresponding to the generated code value and driving an actuator to perform the auto-focusing; and (B-3) checking displacement of a camera lens according to the auto-focusing, and then, extracting data of the distance to the subject corresponding to the displacement of the camera lens.

In accordance with another aspect of the present invention to achieve the object, there is provided an apparatus for controlling light intensity of a camera, which includes: an actuator including at least one lens and moving the lens according to a drive signal applied from the exterior to perform an auto-focusing; a driver configured to generate a current corresponding to a code value transmitted from the exterior and applying the current as the drive signal to the actuator; a memory configured to store a code value for correcting a positional error of the camera and data of a distance to a subject according to displacement of the lens; a flash configured to emitting light while differentiating the light intensity according to the distance to the subject; and a controller configured to reflect the cold value for correcting the positional error of the camera to generate a code value for the auto-focusing and then transmit the generated code value to the driver, check the displacement of the lens according to the auto-focusing to extract the distance to the subject according to the displacement from the memory, and adjust the light intensity of the light emitted from the flash according to the extracted distance to the subject.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, specific embodiments of a method and apparatus for controlling light intensity of the present invention will be described with reference to FIGS. 1 to 7. However, the present invention is provided for the illustrative purpose only but not limited thereto.

The objects, features, and advantages of the present invention will be apparent from the following detailed description of embodiments of the invention with references to the following drawings. Descriptions of well-known components and processing techniques are omitted so as not to unnecessarily obscure the embodiments of the present invention. The following terms are defined in consideration of functions of the present invention and may be changed according to users or operator's intentions or customs. Thus, the terms shall be defined based on the contents described throughout the specification.

This invention may be embodied in different forms and should not be construed as limited to the embodiments set forth herein. Rather, these embodiments are provided so that this disclosure will be thorough and complete, and will fully convey the scope of the invention to those skilled in the art.

Figure 1:
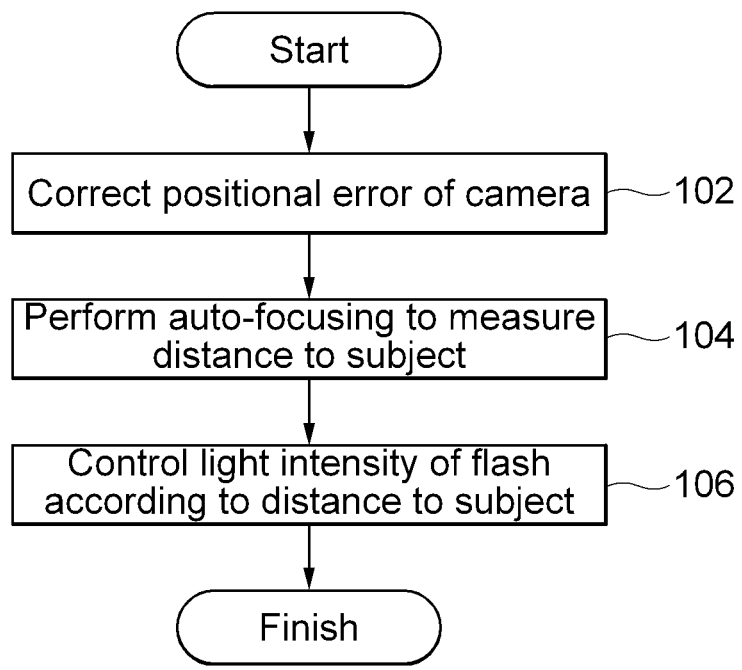
FIG. 1 is a flowchart showing a method of controlling light intensity of a camera in accordance with an embodiment of the present invention.

FIG. 1 is a flowchart showing a method of controlling light intensity of a camera in accordance with the present invention.

Referring to FIG. 1, a method 100 of controlling light intensity of a camera first corrects a positional error of a VCA of the camera (S102). In general, the camera is set to adjust a reference focus distance (for example, 1.2 cm and 10 cm) in a state in which the VCA is in a horizontal posture during a manufacturing process. However, when a user actually performs an auto-focusing function, the camera is used in a state in which the VCA of the camera is in a vertical posture, not in a horizontal posture. In this case, a positional error exists in the VCA of the camera. When the auto-focusing function is performed in a state in which the positional error exists, since the focus distance is varies in actual, the positional error must be corrected.

Figure 2:
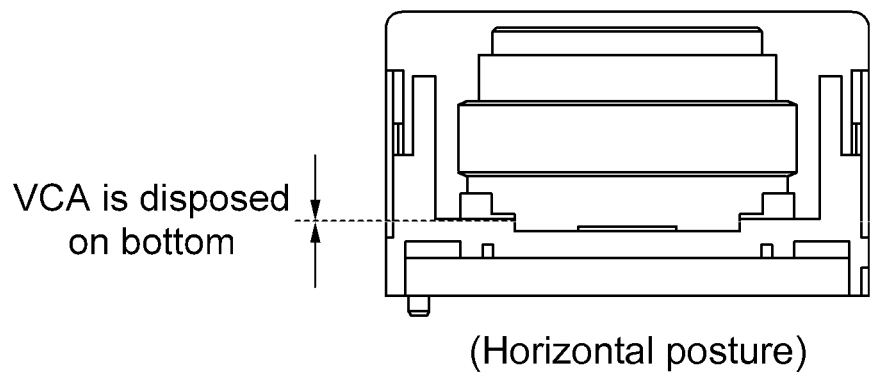
FIG. 2 is a view showing a state in which a VGA of the camera is in a horizontal posture.
Figure 3:
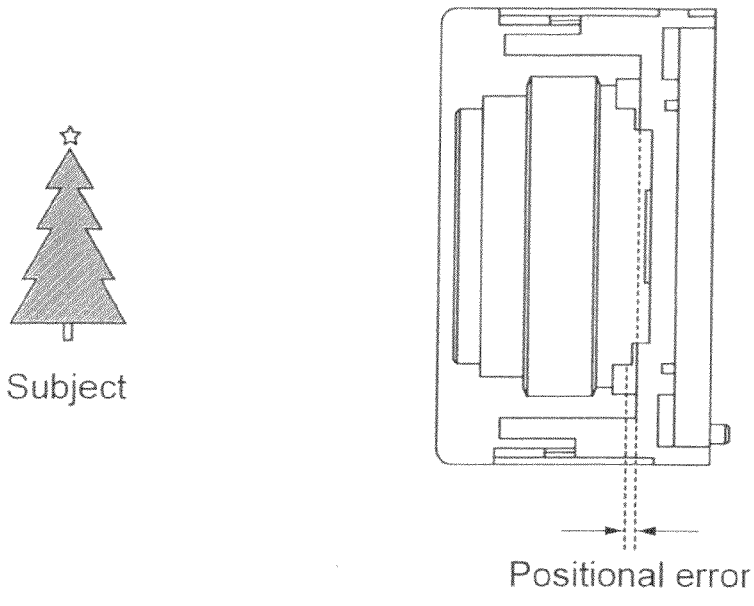
FIG. 3 is a view showing a state in which the VGA of the camera is in a vertical posture.

That is, as shown in FIG. 2, in a process of manufacturing a camera, the reference focus distance is set in a state in which the VCA of the camera is in a horizontal posture. Here, the VCA of the camera is disposed on a bottom. However, under an environment in which the actual user performs the auto-focusing function, as shown in FIG. 3, the VCA of the camera is used in a vertically disposed state. In this case, the VCA of the camera slightly projects forward by gravity, and at this time, a predetermined positional error occurs in comparison with the case where the VCA is in a horizontal posture.

When the auto-focusing function is performed in a state in which the positional error exists, an error of a focus distance is generated. For example, when an infinite as the reference focus distance is set to ½ m in a state in which the VCA of the camera is in a horizontal posture, the infinite is measured to about 1.0 m in a state in which the VCA of the camera is in a vertical posture. Accordingly, in one embodiment of the present invention, the positional error existing in the camera is previously corrected to prevent generation of an error when the auto-focusing function is performed. Specific description of a method of correcting a positional error of a camera will be described below.

Next, the auto-focusing function is performed through the camera to measure a distance from a subject (S104). Since the positional error of the camera is already corrected, there is no error of the focus distance when the auto-focusing function is performed, and thus, an accurate distance to the subject can be measured.

Figure 4:
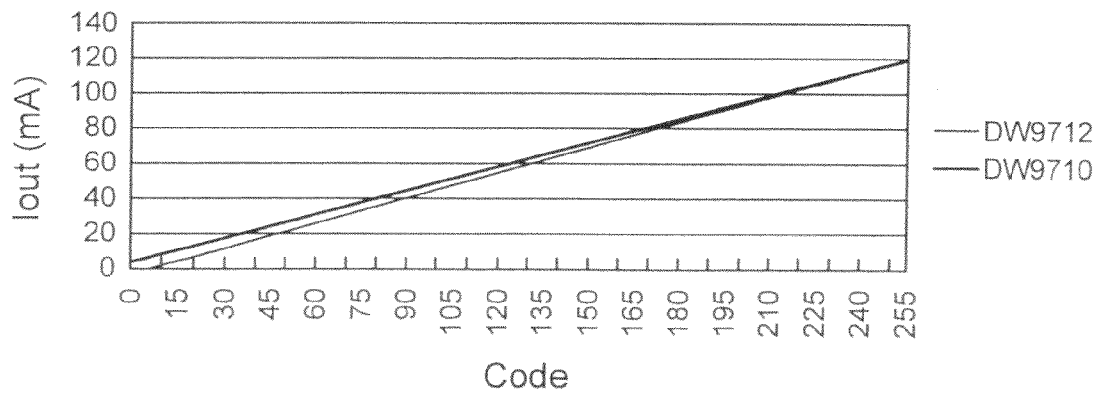
FIG. 4 is a graph showing a code value versus a current value upon auto-focusing.

Specifically, the camera measures a distance from a subject using a current value applied to drive the VCA of the camera when the auto-focusing function is performed. In general, the auto-focusing of the camera is performed using a code value. Since the current value applied to drive the VCA of the camera has the code value and linearity as shown in FIG. 4, the current value can be checked under the condition that the code value is provided.

Figure 5:
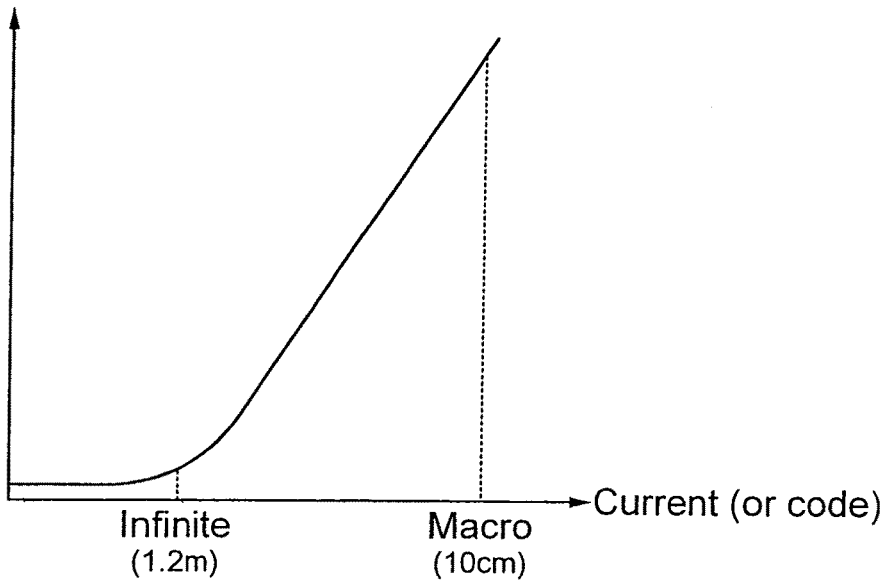
FIG. 5 is a graph showing a displacement versus a current value of a camera lens upon auto-focusing.

Then, the distance to the subject is extracted from the current value. At this time, the distance to the subject can be extracted using displacement of the camera lens according to the current value. FIG. 5 is a view showing a graph of the current versus displacement of the camera lens when the auto-focusing function is performed. Referring to FIG. 5, it will be appreciated that relation between the current and the displacement has linearity between the infinite 1.2 m as the reference focus distance and a macro 10 cm. For example, the displacement of the camera lens during the auto-focusing has a slope of 3.4 μm/mA. Accordingly, the displacement of the camera lens can be obtained by checking the current value applied to drive the VCA of the camera.

Next, a distance from the camera to the subject is extracted through the displacement of the camera lens. For example, the camera stores the distance to the subject according to the displacement of the camera lens in a lookup table way. As a result, the distance to the subject according to the displacement of the camera lens upon performance of the auto-focusing can be easily extracted.

After that, light intensity of the camera is controlled with reference to the distance to the subject (S106). For example, when the subject is disposed at a long distance, the light intensity of the camera is increased and the flash is operated, and when the subject is disposed at a short distance, the light intensity of the camera is reduced and the flash is operated.

Figure 6:
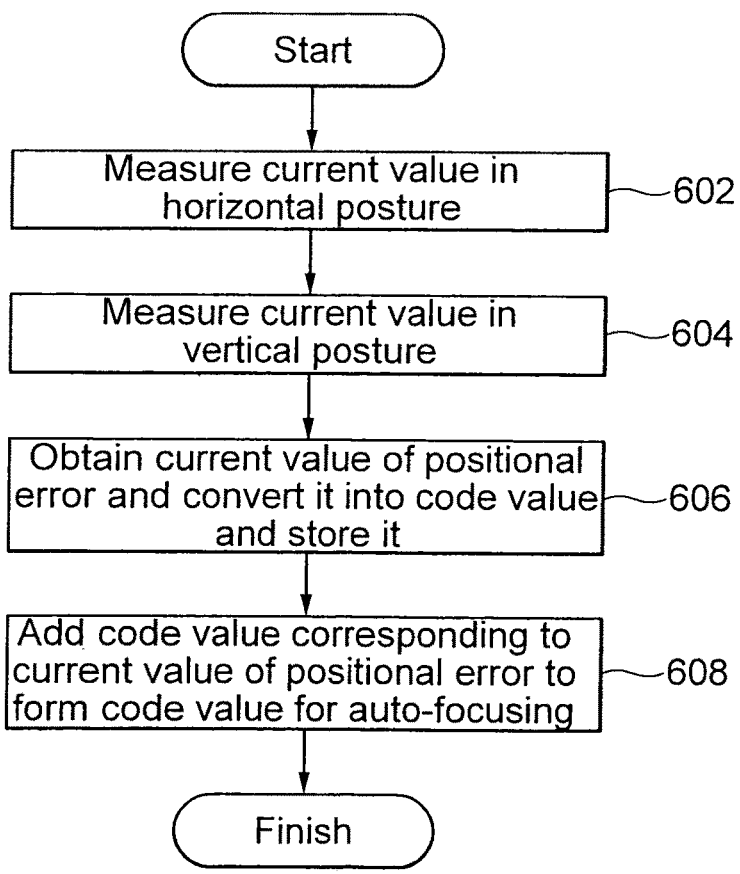
FIG. 6 is a flowchart showing a method of correcting a positional error of a camera in accordance with an embodiment of the present invention.

FIG. 6 is a flowchart showing a method of correcting a positional error of a camera in accordance with an embodiment of the present invention.

Referring to FIG. 6, in a method (102) of correcting a positional error of a camera, first, an auto-focusing function is performed in a state in which a VCA of the camera is in a horizontal posture to measure a current value applied to drive the VCA of the camera (S602).

Next, the auto-focusing function is performed in a state in which the VCA of the camera is in a vertical posture to measure a current value applied to drive the VCA of the camera (S604).

Next, after calculating a current value of the positional error of the camera, the current value is converted into a code value and stored (S606). The current value of the positional error of the camera can be represented as a difference between a current value in a horizontal posture and a current value in a vertical posture (that is, the current value of the positional error=the current value in the horizontal posture−the current value in the vertical posture).

Next, when a user performs the auto-focusing function of the camera, the camera adds a code value corresponding to the current value of the positional error to generate a code value for the auto-focusing (S608). As a result, the auto-focusing function can be performed by correcting the positional error of the camera, and a reference focus distance of the VCA in the horizontal posture is equal to a reference focus distance of the VCA in the vertical posture. Accordingly, precision of the focus distance upon performance of the auto-focusing function can be improved, and a precise distance to the subject can be extracted. In addition, light intensity of the flash according to the distance to the subject can be precisely controlled, and thus, an image having stable color sense can be photographed.

Figure 7:
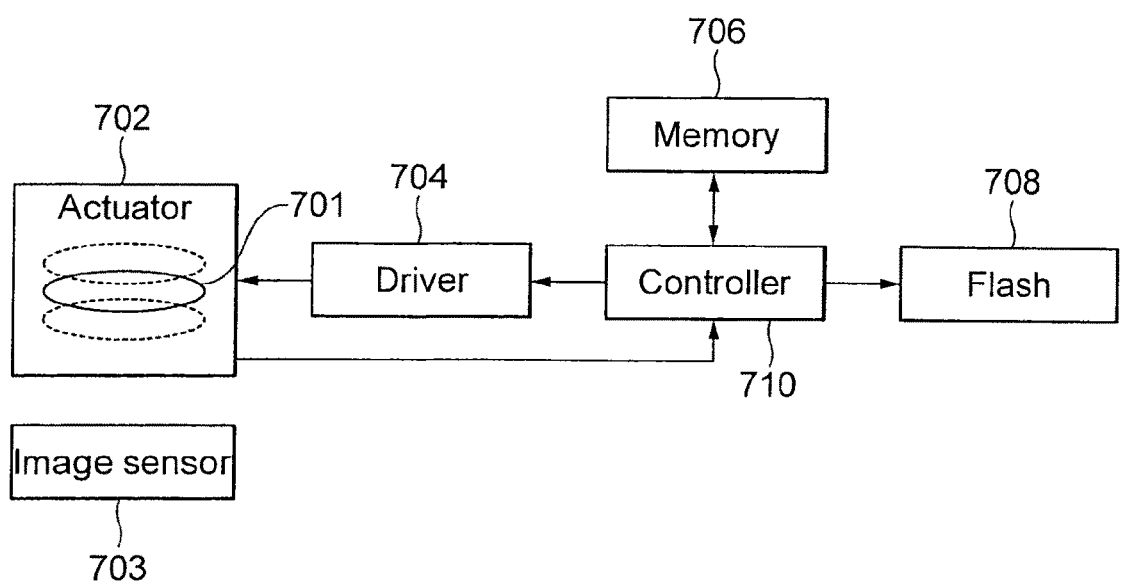
FIG. 7 is a view showing configuration of an apparatus for controlling light intensity of a camera in accordance with an embodiment of the present invention.

FIG. 7 is a view showing configuration of an apparatus for controlling light intensity of a camera in accordance with an exemplary embodiment of the present invention.

Referring to FIG. 7, an apparatus 700 for controlling light intensity of a camera includes an actuator 702, a driver 704, a memory 706, a flash 708, and a controller 710.

The actuator 702 is mounted in a camera module, and includes at least one lens installed therein. The actuator 702 is operated by a drive signal of the driver 704. The actuator 702 moves the lens 701 to vary a position of the lens 701 from an image sensor 703, thereby adjusting a focus.

The actuator 702 is driven by a drive signal of the driver 704 to move the lens from a position nearest to the image sensor 703 (that is, the macro) in a direction far from the image sensor 703, performing the auto-focusing to a position furthest from the image sensor 703 (that is, the infinite).

The driver 704 generates a current corresponding to the code value transmitted from the controller 710 to apply the current to the actuator 702. At this time, the current applied to the actuator becomes the drive signal.

The memory 706 stores the code value for correcting the positional error of the camera. In addition, the memory 706 stores data of the distance to the subject according to the displacement of the lens 701.

The flash 708 adjusts light intensity according to control of the controller 710 to emit light. At this time, the flash 708 adjusts the light intensity according to the distance between the camera and the subject.

The controller 710 controls the respective components. For example, when an order of the auto-focusing function is input by a user, the controller 710 extracts the code value for correcting the positional error of the camera, and then, reflects the code value for correcting the positional error to generate a code value for the auto-focusing. Then, the controller 710 transmits the generated code value to the driver 704.

The controller 710 checks the displacement of the lens according to the auto-focusing, and then, extracts the distance to the subject according to the displacement of the lens 701. At this time, the controller 710 can extract data of the distance to the subject from the memory 706 according to the displacement of the lens 710.

The controller 710 controls the light intensity of the flash 708 according to the extracted distance to the subject.

As can be seen from the foregoing, as the light intensity of the flash is adjusted by the distance to the subject, saturation of the light intensity and lack of the light intensity can be prevented, and thus, quality of the photographed image can be improved.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A method of controlling light intensity of a camera, which comprises:
    generating a code value for correcting a positional error of the camera to store the code value in a memory;
    performing an auto-focusing function through a code value, to which the code value for correcting the positional error is added, to measure a distance to a subject; and
    adjusting light intensity of a flash according to the distance to the subject,
    wherein generating a code value for correcting a positional error of the camera to store the code value in a memory comprises
        performing the auto-focusing function in a state in which the camera is in a horizontal posture to measure a current value applied to drive a voice coil actuator (VCA) of the camera,
        performing the auto-focusing function in a state in which the camera is in a vertical posture to measure a current value applied to drive the VCA of the camera, and
        obtaining a current value of the positional error of the camera, and then, converting the current value of the positional error into a code value to store the code value in the memory.

2. The method according to claim 1, wherein, in obtaining a current value of the positional error of the camera, and then, converting the current value of the positional error into a code value to store the code value in the memory, the current value of the positional error of the camera is a difference between a current value measured in the horizontal posture and a current value measured in the vertical posture.

3. The method according to claim 1, wherein performing an auto-focusing function through a code value, to which the code value for correcting the positional error is added, to measure a distance to a subject comprises:
    adding the code value for correcting the positional error and generating a code value for the auto-focusing;
    generating a current corresponding to the generated code value and driving an actuator to perform the auto-focusing; and
    checking displacement of a camera lens according to the auto-focusing, and then, extracting data of the distance to the subject corresponding to the displacement of the camera lens.

4. An apparatus for controlling light intensity of a camera, which comprises:
    an actuator including at least one lens and moving the lens according to a drive signal applied from the exterior to perform an auto-focusing;
    a driver configured to generate a current corresponding to a code value transmitted from the exterior and applying the current as the drive signal to the actuator;
    a memory configured to store a code value for correcting a positional error of the camera and data of a distance to a subject according to displacement of the lens, the code value for correcting a positional error of the camera generated by
        performing the auto-focusing in a state in which the camera is in a horizontal posture to measure a current value applied to drive a voice coil actuator (VCA) of the camera,
        performing the auto-focusing in a state in which the camera is in a vertical posture to measure a current value applied to drive the VCA of the camera, and
        obtaining a current value of the positional error of the camera, and then, converting the current value of the positional error into a code value to store the code value in the memory;
    a flash configured to emitting light while differentiating the light intensity according to the distance to the subject; and
    a controller configured to reflect the code value for correcting the positional error of the camera to generate a code value for the auto-focusing and then transmit the generated code value to the driver, check the displacement of the lens according to the auto-focusing to extract the distance to the subject according to the displacement from the memory, and adjust the light intensity of the light emitted from the flash according to the extracted distance to the subject.

5. The method according to claim 4, wherein the current value of the positional error of the camera is a difference between a current value measured in the horizontal posture and a current value measured in the vertical posture.

* * * * *

UNITED STATES PATENT AND TRADEMARK OFFICE
CERTIFICATE OF CORRECTION

PATENT NO.         : 8,548,316 B2                                              Page 1 of 1
APPLICATION NO.    : 13/067791
DATED              : October 1, 2013
INVENTOR(S)        : Choon Bok Lee It is certified that error appears in the above-identified patent and that said Letters Patent is hereby corrected as shown below:

On the Title Page Item (56),

In Column 2 (Other Publications), Line 1, After "102537;" insert -- Title: --.
In Column 2 (Other Publications), Line 2, After "Device;" insert -- Inventor: --.
In Column 2 (Other Publications), Line 4, After "0018768;" insert -- Title: --.
In Column 2 (Other Publications), Line 6, After "Flash;" insert -- Inventor --.

Signed and Sealed this
Twenty-fifth Day of March, 2014

Michelle K. Lee
*Deputy Director of the United States Patent and Trademark Office*